United States Patent Office 3,642,708
Patented Feb. 15, 1972

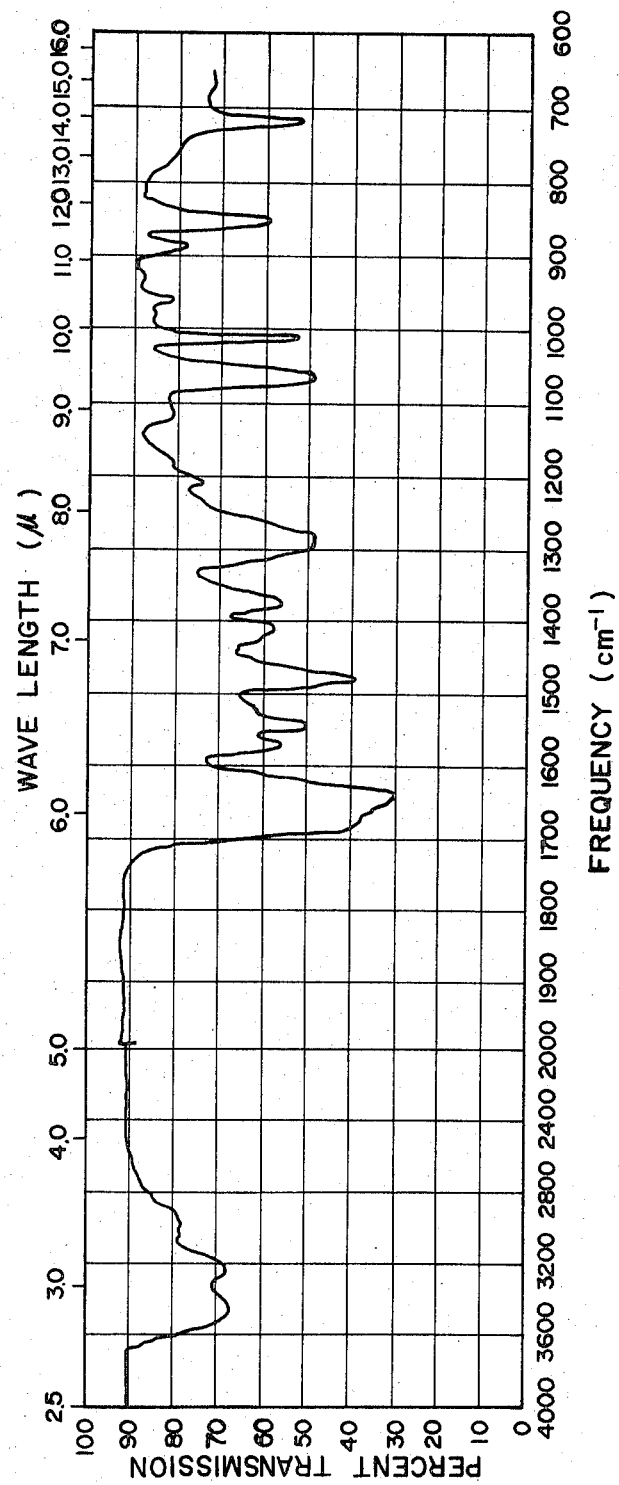

3,642,708
OXADIAZOLE-N-METHYLHYDRAZIDE CO-
POLYMERIC RESIN AND A METHOD
OF PRODUCING THEREOF
Hideo Sekiguchi, Yokohama, and Kazuo Sadamitsu,
Tokyo, Japan, assignors to The Furukawa Electric
Company Limited, Chiyoda-ku, Tokyo, Japan
Filed Feb. 15, 1968, Ser. No. 705,718
Claims priority, application Japan, Feb. 22, 1967,
42/11,270; Aug. 21, 1967, 42/53,670; Sept. 22,
1967, 42/60,926
Int. Cl. C08g 20/20
U.S. Cl. 260—78 R         12 Claims

ABSTRACT OF THE DISCLOSURE

Polyoxadiazole series resin having solubility in addition to a high heat resistance is prepared by reacting polyoxadiazole with methyl sulfate in sulfuric acid, whereby the oxadiazole ring is opened and N-methylhydrazide structural unit is formed and introduced into the resulting product to form copolymeric resin having N-methylhydrazide structural unit and polyoxadiazole structural unit.

---

Figure 1:
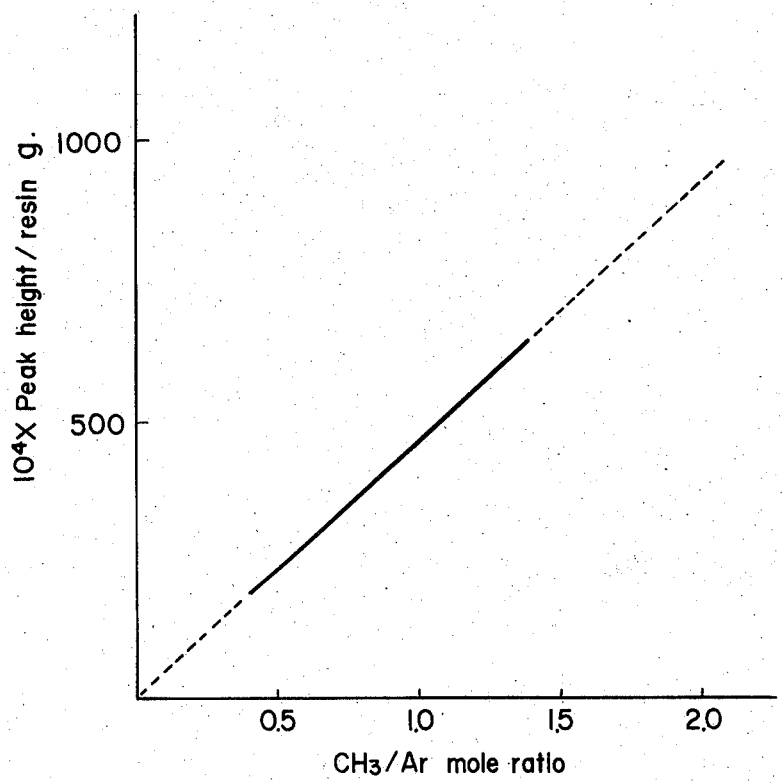

The copolymeric resin obtained according to the present invention is useful in various shaped articles and insulated electrical wires, having excellent heat resistance as well as excellent mechanical and electrical properties.

The present invention relates to novel oxadiazole-N-methylhydrazide copolymeric resin, which is soluble in organic solvents and has a high heat resistance, a production method thereof, a method of converting the said resin into oxadiazole resin, and resin products made from above mentioned resins.

Recently, polyoxadiazole resin has been developed as a resin having a high heat resistance but said resin has neither melting point nor softening point and is not soluble in organic solvents, so that it is not usable.

Heretofore, as a method for utilizing such a resin having a high heat resistance but the above described drawbacks, a process has been proposed in which an intermediate product soluble in organic solvents is firstly formed in the production and during or after forming said intermediate product subjected to a cyclodehydration by chemical or thermal treatment, whereby said intermediate product is converted into a resin having a higher heat resistance.

As to polyoxadiazole, J. Polymer Sci. A2 1157 (1964) discloses that polyhydrazide is formed as an intermediate product and then cyclodehydrated by heating and converted into polyoxadiazoleresin. However, it is difficult to dissolve the polyhydrazide in organic solvents and also to convert the polyhydrazide into oxadiazole by the cyclodehydration, so that such a process has not been put to commercial use.

An object of the present invention is to overcome these defects of polyoxadiazole resin and to provide oxadiazole-N-methylhydrazide copolymeric resin which is soluble in organic solvents and has an excellent heat resistance.

Another object of the present invention is to provide a method of producing the said novel copolymeric resin having such properties.

A further object of the present invention is to provide useful resin products and insulated electric wires having excellent heat resistance and mechanical and electrical properties by casting or baking a solution of the said copolymeric resin in an organic solvent, or a further heat treatment at a higher temperature.

Noting the excellent heat resistance of the polyoxadiazole resin, the inventors have made various studies on a method of turning it into an easily usable resin and found that the said copolymeric resin consisting of 30 to 70 mol percent of N-methylhydrazide structural unit having the general formula

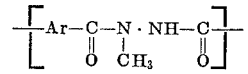

and 70 to 30 mol percent of oxadiazole structural unit having the general formula

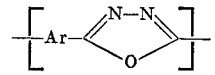

wherein Ar is bivalent aromatic residues, is soluble in organic solvents and has excellent heat resistance and mechanical and electrical properties.

Furthermore, it has been found that the said copolymeric resin can be produced by reacting polyoxadiazole having the following repeated unit

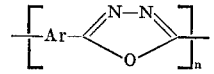

wherein Ar is bivalent aromatic residues and $n$ is a polymerization degree corresponding to an inherent viscosity of more than 0.3 in 0.5% solution in concentrated sulfuric acid at 30° C. and an integer, with mono- or dimethyl sulfate (hereinafter called the "the methyl sulfates") in a concentrated or fuming sulfuric acid (hereinafter called "the sulfuric acid").

The reaction producing the N-methylhydrazide structural unit is as follows:

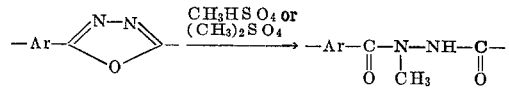

Surprisingly, such a resin is very readily soluble in organic polar solvents, such as inexpensive phenol, cresol and xylenol in addition to N,N'-dimethylformamide, N,N'-dimethylacetamide, N-methyl pyrrolidone and dimethylsulfoxide or mixed solvents composed of these solvents as the main component and non-solvents such as solvent naphtha, xylene, toluene, acetone and so on, and the resulting solution can be cast or baked into resin products and insulated electric wires having various highly useful properties, such as heat resistance and mechanical and electrical properties.

It has been found that when the above described said copolymeric resin is heated at a temperature of 220° C. to 600° C., methanol is separated from the said resin, and the oxadiazole ring is again closed to form a resin having an extremely high heat resistance.

The reaction cycling the N-methylhydrazide structural unit to oxadiazole unit is as follows:

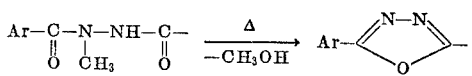

Polyoxadiazole to be used in the present invention can be produced by the following known processes.

Namely, (1) J. Polymer Sci. A3 45 (1965) discloses that said polyoxadiazole is produced by reacting aromatic dibasic acid or the derivatives thereof with hydrazine or a salt thereof in fuming sulfuric acid or poly phosphoric acid.

(2) J. Polymer Sci. A2 1157 (1964) discloses that an aromatic dibasic acid halide is reacted with hydrazine or aromatic dibasic acid dihydrazide in the presence of acid acceptor to produce polyhydrazide, which is converted into oxadiazole by heating.

(3) Makromol. Chem. 44–6 388 (1961) discloses that bistetrazole derived from aromatic dibasic acid is reacted with aromatic dibasic acid halide in the presence of acid acceptor to produce polyoxadiazole.

The above described dibasic acid includes, for example, terephthalic acid, isophthalic acid, 4,4'-dicarboxydiphenyl, 4,4'-dicarboxydiphenyl ether, 3,4'-di-carboxydiphenyl ether, 4,4'-dicarboxydiphenyl sulfide, 4,4'-dicarboxydiphenylsulfone, etc. The derivatives of these dibasic acids include alkyl ester of alkyl having 2 to 4 carbon atoms, for example, diethyl terephthalate, diisopropyl terephthalate, dibutyl terephthalate, diethyl isophthalate; amide, such as terephthalamide, isophthalamide, etc.; dihydrazide, such as terephthal dihydrazide, isophthal dihydrazide, etc. and nitrile, such as terephthalonitrile, isophthalonitrile, etc.

It is preferable that polyoxadiazole to be used in the present invention is produced by the above described known process (1). Namely, the dibasic acid is reacted with hydrazine (the hydrazine is used 2 mol percent to 20 mol percent in excess over dibasic acid) in the presence of fuming sulfuric acid containing sulfuric anhydride corresponding to an amount of at least 4 times mol of the dibasic acid component at a temperature of 90° C. to 160° C.

The molecular weight of the polyoxadiazole to be used in the present invention is not particularly limited, but it is preferable to be high molecular weight, in order to possess properties of practically useful resin. Accordingly, the practically useful molecular weight is one having an inherent viscosity of more than 0.3 in 0.5% resin solution in concentrated sulfuric acid at 30° C.

According to the present invention, in order to produce the copolymeric resin consisting of the N-methylhydrazide structural unit and the oxadiazole structural unit from the polyoxadiazole, said polyoxadiazole is reacted with the above described methyl sulfates in the sulfuric acid, the methyl sulfates being added in such an amount that the methyl groups in said sulfate are 0.4 to 1.4 mole against 1 mole of the aromatic residue in the polyoxadiazole.

The reason why the amount of the methyl sulfates present in the reaction system is limited as described above, is based on the fact that if the methyl sulfates are less than the lower limit, the resin obtained in the synthetic reaction is too small in the amount of N-methylhydrazide unit in the molecule, so that said resin is insoluble in organic solvents and does not attain the objects of the present invention.

Furthermore, when the methyl sulfates exceed the upper limit, the resulting resin is too large in the amount of N-methylhydrazide unit in the molecule and the heat resistance lowers and further in the cyclization into oxadiazole due to the heat treatment at a higher temperature, which is one aspect of the present invention, the separation of alcohol as the cyclization product occurs excessively and the decrease of weight is larger and further undesirable foaming occurs.

Thus, when the amount of N-methylhydrazide unit in the copolymeric resin increases, the solubility in organic solvent is enhanced, while the amount of alcohol formed in said heat treatment at higher temperature increases. On the other hand, the amount of oxadiazole unit contributes to improvement of the heat resistance, but adversely affects the solubility in organic solvents.

As mentioned above, in order to attain the objects of the present invention, the N-methylhydrazide structural unit is 30 to 70 mol percent and the oxadiazole structural unit is 70 to 30 mol percent, preferably the former unit being 45 to 55 mol percent and the latter unit being 55 to 45 mol percent. Correspondingly, the methyl sulfates are added in such an amount that the methyl groups are 0.4 to 1.4 mole, preferably, 0.6 to 1.2 mole, per mole of the aromatic residue of polyoxadiazole of the starting material.

In order to explain this fact in more detail, the amount of the methyl sulfates added and a result, when the resulting resins (dibasic acid component being only terephthalic acid) was heated at 300° C. for 2 minutes and the amount of alcohol generated was measured by gas chromatography, are shown in FIG. 1.

In the drawing, the solid line means the scope of the present invention and the dotted line means outside of the scope of this invention and the peak heights 500 and 1,000 correspond to 1.1 and 2.2 μl. of methanol respectively.

As shown in the drawing, the smaller the quantity of methyl group in the reaction system, the smaller the quantity of methanol separated from the resin. However, when the quantity of methyl group is less than 0.4 mole per mole of the aromatic residue, the resulting resin becomes insoluble in organic solvents.

The molecular weight of said copolymeric resin obtained in the present invention is not particularly limited, but it is preferable to be high molecular weight in order to possess properties of practically useful resin. Accordingly, the practically useful molecular weight is one having an inherent viscosity of more than 0.3 in 0.5% resin solution in organic solvents such as m-cresol, m-methylpyrrolidone, N,N'-dimethylformamide, at 30° C.

The concentration of the sulfuric acid to be used in the present invention can be used in not lower than 80% equivalent, because in lower than 80%, the polyoxadiazole and the produced copolymer do not form a homogeneous solution and further a side reaction of hydrolysis of the resin occurs, so that such a concentration is not preferable. On the other hand, when the concentration of the sulfuric acid is too high, the reaction system is solid at room temperature, so that the handling is difficult. Accordingly, the concentration of the sulfuric acid is preferable within the range of 80 to 110% by equivalent, more particularly 90–110% by equivalent.

The reaction temperature in the method of the invention can range from room temperature to a high temperature, but if the reaction temperature is too low, the reaction needs a long time, while if the reaction temperature is too high, a side reaction of decomposition of the resin is caused, so that the reaction temperature is 60 to 160° C., more particularly, 80 to 150° C.

The reaction time in the method of the invention has an interrelation to the reaction rate of the methyl sulfates to be added, but it is desirable that the reaction is completed less than 24 hours with the reaction rate of the methyl sulfates being less than 80%, more particularly about 50%. However, this reaction time does not restrict the method of the invention.

The methyl sulfates to be added in the method of the invention can attain completely the same purpose by adding the methyl sulfates themselves or by adding a substance which can react with the concentrated sulfuric acid in the reaction system to form the methyl sulfates.

The "substance which can react with the concentrated sulfuric acid to form the methyl sulfates" above referred to means, for example, methanol, methyl ether, methyl formate, methyl acetate, methyl benzoate, etc.

Furthermore, in the method of producing oxadiazole in the above described known process (1), it is possible to react compounds having the general formula

wherein Ar is bivalent aromatic residues and —CX is —COOH, —COOR (R is alkyl groups having 2 to 4 carbon atoms), —CONH$_2$, —CONHNH$_2$ or —CN, and hydrazine or the salt thereof in fuming sulfuric acid in the presence of the methyl sulfates to obtain a solution containing polyoxadiazole and methyl sulfates together.

The wording "in the presence of the methyl sulfates" used herein means, as mentioned above, adding the methyl sulfates themselves, adding a substance which can react with the sulfuric acid in the reaction system to form the methyl sulfates, or using dimethyl ester of aromatic dibasic acid, such as, dimethyl terephthalate, dimethyl isophthalate, 4,4'-dimethoxycarbonyldiphenyl ether, 4,4′ - dimethoxycarbonyldiphenyl, 4,4′ - dimethoxycarbonyldiphenylsulfide, 4,4′-dimethoxycarbonyldiphenylsulfoxide, etc., which corresponds to the equivalent of methyl groups in the methyl sulfates partly in place of reacting compounds having the general formula $$XC-Ar-CX$$

in the said reaction.

Namely, the addition of the methyl sulfates to the reaction system may be effected in any stage in the reaction and the methyl sulfates may be added to the solution of polyoxadiazole in the concentrated sulfuric acid, or may be added before or during production of polyoxadiazole of starting materials.

The infrared absorption spectrum of the copolymeric resin produced in the invention shows absorptions of NH groups of 3260 cm.$^{-1}$, CO group of 1660 cm.$^{-1}$, CH$_3$ group of 2980 cm.$^{-1}$, and 1380 cm.$^{-1}$, which are not found in the polyoxadiazole of the starting material, and the introduction of N-methylhydrazide unit has been confirmed.

As mentioned above, the copolymeric resins containing N-methylhydrazide unit, which are produced in the present invention, cause separation of methanol by heating these resins at a temperature of 220° C. to 600° C. and cyclize to oxadiazole, whereby the original polyoxadiazole is regenerated.

Accordingly, the copolymeric resins, as such, can be used as useful materials having a high heat resistance and excellent mechanical, electrical and chemical properties, but if materials having a high heat resistance are required, such materials can be obtained by heating the said copolymeric resins, at the higher temperature as described above and converting into polyoxadiazole.

In the above described heat treatment of the resulting copolymeric resin, from the result of gas chromatography the separation of methanol can be observed at a temperature not lower than 220° C. and at a temperature lower than 220° C. no methanol is separated, so that it is necessary to effect the heat treatment at a temperaure not lower than 220° C. On the other hand, in the result of thermogravimetric analysis, if the heat treatment is effected at a temperature higher than 660° C., a thermal breakage of the main chain of said resin molecule occurs noticeably other than the separation of methanol and such a high temperature is not preferable. Accordingly, the temperature in said heat treatment is preferably within the range of 220 to 600° C.

In order to form the said copolymeric resins containing N-methylhydrazide units obtained by the present invention into useful shaped articles, a solution consisting of the said copolymeric resin dissolved in organic polar solvents, such as, N-methylpyrrolidone, N,N′-dimethylacetamide, N,N′-dimethylformamide, dimethylsulfoxide, m-cresol, cresylic acid, phenol, or mixtures of said solvents and nonsolvents, such as xylene, toluene, solvent naphtha, acetone, etc. to these solvents, is used as dope, which is given a proper shape and then made free of solvents. Alternatively, in order to convert the said copolymeric resin into polyoxadiazole the resin products can be formed by heating at a temperature not lower than 220° C. in the drying process or by heating further at said temperature after heating at a temperature lower than 220° C.

In some case, the resin products can be formed directly without using organic solvents.

Film can be formed by spreading the solution of the copolymeric resin over a base plate, preferably preheating at a temperature lower than 200° C. for less than 1 hour and then stripping the film from the base plate and thereafter completely drying said film at a temperature higher than 150° C. In this case, the film can be provided with further improved properties by adding a drawing step in the secondary drying.

A forming of impregnated cloth can be effected by impregnating the base fabric with the said copolymeric resin solution and then treating the impregnated fabric under the same drying condition as in the above described film, but can be effected with the other usual drying process.

The formation of coated film by using said copolymeric resin solution as a baking varnish, particularly insulating varnish, may effected by coating the solution of the said copolymeric resin on an electrical conductor and then baking at a temperature of 200 to 400° C.

In case of producing laminates of various materials, such as metals, inorganic materials or organic materials by using the said copolymeric resin solution as an adhesive, said resin solution is coated on the surfaces to be bonded of said materials and heated at a temperature lower than 220° C. to form resin layers and then surfaces coated with the resin layers are put together and compressed at a temperature of 100 to 400° C. under a pressure of about 10 to 30 kg./cm.² mechanically or through a medium, such as, gas or liquid.

The materials, which can be laminated in the above described means, include metals, such as aluminium, copper, stainless steel, iron, titanium, etc.; inorganic materials, such as, porcelains, glass cloths, asbestos plates, etc.; and organic materials, such as, various kinds of plastics, wood, paper, cloths, etc.

Furthermore, the laminates can be produced by interposing a resin film previously molded from the copolymeric resin solution at a temperature lower than 220° C., between the surfaces to be bonded of the materials and then compressing said materials in the same manner as described above. Moreover, in this case, instead of the said resin film, glass cloths, paper or fibrous cloths impregnated with the said resin can be used. In bonding the materials as described above, it is preferable that the surface to be bonded is previously cleaned or given a proper treatment for easy bonding.

Furthermore, it is possible to obtain foams from the resin of this invention by the following process. The resin is primarily formed into a sheet, board and other desired shapes and the shaped resin is heated at a temperature higher than 220° C., preferably, 250 to 350° C. under atmospheric pressure, mechanical pressure, pressure through gas or liquid or substantially pressed state in which said shaped resin is interposed between two bodies which are difficult to be deformed, whereby alcohol and thermally decomposed products are split and the resin is primarily softened thermally to form foam having fine cells.

As mentioned above, the oxadiazole-N-methylhydrazide copolymeric resin according to the present invention can be widely used for resin products, such as films, impregnated materials, varnishes, filaments and foams.

For a better understanding of the invention reference is made to the accompanying drawings, wherein:

FIG. 1 is a diagram showing a relation between mole ratio of methyl group in the methyl sulfate to aryl residue in the polyloxadiazole in the reaction of the polyoxadiazole with the methyl sulfates according to the present invention and an amount of low molecular weight substance evolved from the resulting resins due to heating; and FIG. 2 is a diagram showing infrared absorption spectrum of an embodiment of resin obtained in the present invention.

The invention will be further explained in detail by the following examples. "Part" in the example means by weight.

EXAMPLE 1

332 parts of terephthalic acid, 273 parts of hydrazine sulfate and 3300 parts of fuming sulfuric acid containing 30% SO$_3$ (106 equivalent percent) were charged into a reaction vessel, and the resulting mixture was reacted at 90° C. for 2 hours and further at 130° C. for 5 hours to obtain a solution of polyoxadizole in fuming sulfuric acid. The resulting polyoxadiazole resin had an inherent viscosity of 2.3 in 0.5% resin solution in 95 weight percent sulfuric acid at 30° C. Then the above mentioned polyoxadiazole solution was diluted by adding with 1300 parts of 95 eq. percent sulfuric acid at 80° C. to obtain a solution of polyoxadiazole resin in sulfuric acid, in which the concentration of the polyoxadiazole resin was 4% and that of sulfuric acid was 100 eq. percent.

Into 3000 parts of this solution was added 63 parts of dimethyl sulfate and the resulting mixture was heated at 140° C. while stirring for 6 hours. The reaction solution was poured into a large amount of water to precipitate white colored resin, which was washed thoroughly with water until sulfuric acid was removed, and then dried under vacuum at 90° C. to obtain an object product. Polyoxadiazole is generally insoluble in all organic solvent, but the resin obtained in this example was soluble in the organic solvents, such as N-methylpyrrolidone, N,N' - dimethylformamide, N,N' - dimethylacetamide, dimethyl sulfoxide, m-cresol, etc.

The inherent viscosity of 0.5% resin solution in m-cresol at 30° C. was 0.72. The resulting resin was hydrolysed and amounts of N-methylhydrazine and hydrazine in the hydrolysed product were measured and the ratio of N-methyl-hydrazide unit and oxadiazole unit was determined and N-methylhydrazide unit was 54 mol percent and oxadiazole unit was 46 mol percent.

When the infrared absorption spectrum of this resin film was measured, absorption bands of 3260 cm.$^{-1}$ assigned to NH, 1660 cm.$^{-1}$ assigned to CO, 2980 cm.$^{-1}$ and 1380 cm.$^{-1}$ assigned to $CH_3$ were observed, and absorption band of 960 cm.$^{-1}$ and 1610 cm.$^{-1}$ corresponding to oxadiazole unit was observed as shown in FIG. 2, so that the presence of the oxadiazole unit and the N-methylhydrazide unit was confirmed.

EXAMPLE 2

Into 200 parts of the solution of polyoxadiazole in 100 eq. percent sulfuric acid used in Example 1 was added 2.8 parts of methanol to obtain a homogeneous solution. The resulting solution was heated at 95° C. for 20 hours while stirring, and then treated in the same manner as described in Example 1 to obtain a dried resin, which was soluble in cresol, N-methylpyrrolidone, N,N'-dimethyl acetamide, N,N'-dimethyl formamide and the like, and had an inherent viscosity of 1.4 in 0.5% resin solution in N-methylpyrrolidone at 30° C.

Cresol solution containing 20% of this resin was spread on a hard-chromium plated plate, which had been mirror finished, and dried at 160° C. for 10 minutes, after which a film having a thickness of 25μ was peeled off. The thus obtained film was dried at 210° C. for 1 hour while applying two axial drawing of 1.5 times to obtain a light brown transparent film which had a tensile strength of 1650 kg./cm.$^2$, an elongation of 18%, a dielectric constant of 3.2 (60 c.p.s.), a volumetric resistivity of more than $10^{16}$ and a dielectric strength of 240 v./mm., and it could be used for a long period of time at 180° C.

EXAMPLE 3

To 1,000 parts of the solution dissolved 4% of polyoxadiazole in 100 eq. percent sulfuric acid obtained in Example 1 were added 6,4 parts of dimethyl ether under pressure to obtain a homogeneous solution. The resulting solution was heated at 135° C. and stirred for 6 hours to obtain yellowish white resin by the same treatment as described in Example 1.

This resin was soluble in cresol, N-methylpyrrolidone, N,N'-dimethyl acetamide and N,N'-dimethyl formamide and the inherent viscosity of 0.5% resin solution in N-methylpyrrolidone at 30° C. was 1.3.

15% solution of this resin in a mixed solvent of cresol and solvent naphtha (mixture ratio 4:1) was baked on copper wire of 1 mm. dia. in 6 m. furnace at 180 to 320° C. 6 times so as to obtain the film thickness of 50 microns, whereby insulated electric wire was obtained, the properties of which are as follows:

Dielectric strength—12 kv.
Abrasion scrape resistance (load of 700 g., NEMA Standard)—48 times
Heat aging test:
    (250° C.×24 hrs. in air)—wrap 2X OK
    (220° C.×10 days in air)—dielectric strength 11 kv.
Heat shock resistance (250° C.×1 hr.)—wrap 1X OK
Chemical resistance (room temperature×48 hrs.)—50% NaOH aqueous solution, no change; 30% $H_2SO_4$ aqueous solution, no change

EXAMPLE 4

40 parts of metaphenylenebistetrazole and 38 parts of terephthaloyl chloride were added to a mixed solvent consisting of 800 parts of hexamethylphosphoramide and 30 parts of pyridine and the resulting mixture was stirred at room temperature for 2 days and then poured into water to obtain white precipitate. This precipitate was washed thoroughly with water and dried to obtain polyoxadiazole having an inherent viscosity of 0.35 in 0.5% resin solution in 95 weight percent sulfuric acid at 30° C.

8 parts of this polyoxadiazole was dissolved in 192 parts of 95 eq. percent sulfuric acid and then reacted with methanol in the same manner as described in Example 2. The infrared absorption spectrum of the resulting resin was very similar to that of the resin obtained in Example 1 and the formation of N-methylhydrazide unit was confirmed.

EXAMPLE 5

95 parts of terephthalic acid, 285 parts of isophthalic acid, 314 parts of hydrazine sulfate and 2050 parts of 40% $SO_3$ fuming sulfuric acid (109 eq. percent) were reacted at 90° C. for 2 hours while being stirred in a reaction vessel. Then 34 parts of methyl benzoate and 32 parts of methanol were added thereto, and the resulting mixture was heated and reacted at 130° C. for about 4 hours, while being stirred to obtain a solution of desired copolymeric resin in fuming sulfuric acid. The resulting solution was treated in the same manner as described in Example 1 to obtain a resin having an inherent viscosity of 0.52 in 0.5% resin solution in N,N'-dimethyl formamide. The infrared absorption spectrum of the resin showed the presence of N-methylhydrazide unit as in the case of Example 1. This resin was soluble in organic solvents, such as N,N'-dimethyl formamide, N-methylpyrrolidone, cresol etc.

EXAMPLE 6

267 parts of isophthalic acid dihydrazide and 249 parts of terephthalic acid were dissolved in 6780 parts of 30% $SO_3$ fuming sulfuric acid and reacted at 85° C. for 1 hour, and then 900 parts of 30% fuming sulfuric acid and 96 parts of methanol were added thereto, and the resulting mixture was reacted at 130° C. for 8 hours. The reaction mixture was treated in the same manner as described in Example 1 to obtain a resin having an inherent viscosity of 0.80 in 0.5% resin solution in m-cresol at 30° C.

100 parts of the thus obtained resin could be dissolved in a mixed solvent composed of 300 parts of cresylic acid and 100 parts of solvent naphtha to obtain a solution of the resin. The solution was coated on a glass plate and then heated at 150° C. for 30 minutes and further at 200° C. for 1 hour to obtain a transparent film having a thickness of about 25μ, the tensile strength, the elongation and the Young's modulus of which were 880 kg./cm.$^2$, 5% and 300 kg./mm.$^2$ respectively.

Even though the above mentioned film was heated at 180° C. for 1,000 hours in the air, no change was noted so that this film was excellent in heat resistance.

EXAMPLE 7

166 parts of terephthalic acid, 26 parts of 4,4'-dicarboxydiphenyl ether, 160 parts of hydrazine sulfate and 25 parts of dimethyl ether were added to 5,500 parts of 30% $SO_3$ fuming sulfuric acid and the resulting mixture was stirred at room temperature. The reaction temperature was raised to 140° C. and the reaction was continued for 10 hours while maintaining this temperature. Then the reaction mixture was treated in the same manner as described in Example 1 to obtain a resin having an inherent viscosity of 1.3 in 0.5% resin solution in m-cresol at 30° C.

EXAMPLE 8

194 parts of dimethyl terephthalate, 166 parts of terephthalic acid and 273 parts of hydrazine sulfate were dissolved in 5,500 parts of 30% $SO_3$ fuming sulfuric acid and the resulting mixture was reacted at 130° C. for 6 hours. Then the reaction mixture was poured into a large amount of cold water to precipitate white resinous reaction product, which was washed with water fully to remove sulfuric acid and then dried at 100° C. under a reduced presusre. The resulting resin had an inherent viscosity of 0.95 in 0.5% resin solution in m-cresol at 30° C.

EXAMPLE 9

100 parts of terephthalic acid, 78 parts of dimethyl terephthalate, 137 parts of hydrazine sulfate and 3,000 parts of 30% $SO_3$ fuming sulfuric acid were treated in the same manner as described in Example 8 to obtain a resin.

EXAMPLE 10

66 parts of terephthalic acid, 116 parts of dimethyl terephthalate, 137 parts of hydrazine sulfate and 3,000 parts of 30% $SO_3$ fuming sulfuric acid were treated in the same manner as described in Example 8 to obtain a resin.

The inherent viscosities in 0.5% resin solution in m-cresol at 30° C. and the solubilities in organic solvents of the resins obtained in Examples 8, 9, 10 are shown in the following Table 1. In Table 1, comparative Example 1 is polyoxadiazole of the starting material, which was obtained without adding dimethyl terephthalate, and comparative Example 2 is a resin obtained by reacting and treating 194 parts of dimethyl terephthalate, 137 parts of hydrazine sulfate and 3,000 parts of 30% $SO_3$ fuming sulfuric acid in the same condition as described in Example 8.

TABLE 1

| | Methyl/Ar-group/residue (mol ratio) | $\eta_{inh}$ | Solubility | | | |
|---|---|---|---|---|---|---|
| | | | DMF | NMP | m-Cresol | 95 wt. percent sulfuric acid |
| Comparative Example 1. | 0 | | Insoluble | Insoluble | Insoluble | Soluble. |
| Example: | | | | | | |
| 9 | 0.8 | 0.70 | Swelled | Swelled | Soluble | Do. |
| 8 | 1.0 | 0.95 | do | Partially soluble | do | Do. |
| 10 | 1.2 | 0.87 | Partially soluble | do | do | Do. |
| Comparative Example 2. | 2.0 | 1.32 | Soluble | Soluble | do | Do. |

The resins obtained in Examples 8, 9, 10 and comparative Example 2 were heated at 300° C. for 2 minutes and the amount of methanol evolved was determined by a gas chromatography to obtain a result as shown in Table 2.

TABLE 2

| Comparative: | Amount of methanol evolved ($\mu.l/1$ g. resin) |
|---|---|
| Example 2 | 2.85 |
| Example 10 | 1.53 |
| Example 9 | 1.24 |
| Example 8 | 1.40 |

As seen from the above Table 2, the resin in comparative Example 2 obtained by synthesis under the condition, which was outside the scope of techniques involved in the present invention, was considerably larger in the amount of volatile component than the resin according to the invention.

When the infrared absorption spectrum was measured with respect to the resin before and after heating in the above mentioned measurement by gas chromatography, in the resin after heating the absorption bands of 3260 cm.$^{-1}$ assigned to NH group and 1660 cm.$^{-1}$ assigned to CO group showing the presence of N-methylhydrazine unit decreased and the absorption band of 960 cm.$^{-1}$ assigned to oxadiazole unit increased as compared with the resin before heating.

Further, when solutions, each 20% in m-cresol of the resin obtained in Example 8 and the resin in comparative Example 2 obtained by synthesis under the condition, which was outside the scope of techniques involved in the present invention, were coated on a glass plate respectively and heated at 280° C. for 20 minutes, a smooth and beautiful film was produced from the solution containing the resin obtained in Example 8, but a film was not produced from the solution containing the resin of comparative Example 2, because the solution foamed violently and the resin shrinked.

Each solution of the above mentioned two resins was coated on a glass plate and heated at 180° C. for 30 minutes to form a film having a thickness of about 25$\mu$. The resulting film was further heated at 200° C. for 50 hours. The mechanical strength of the resulting film was measured with the result as shown in Table 3.

TABLE 3

| | Tensile strength (kg./cm.$^2$) | | Flexibility after heating |
|---|---|---|---|
| | Before heating | After heating at 200° C. for 50 hours | |
| Comparative Example 2 | 900 | 480 | Brittle. |
| Example 8 | 920 | 915 | Tough. |

EXAMPLE 11

166 parts of terephthalic acid, 194 parts of dimethyl isophthalate and 273 parts of hydrazine sulfate were dissolved in 5,000 parts of 30% $SO_3$ fuming sulfuric acid, and the resulting mixture was treated under the same condition as described in Example 8 to obtain a white powdery resin, which had an inherent viscosity of 0.48 in 0.5% resin solution in m-cresol at 30° C.

EXAMPLE 12

A solution of 15% of oxadiazole-N-methylhydrazide copolymeric resin in cresol obtained in Example 1 was coated on an aluminium plate having a thickness of 1 mm. and a copper foil having a thickness of 0.1 mm., and then baked at 150° C. for 1 hour so as to obtain a baked layer having a thickness of 25$\mu$. The coated faces of said aluminium plate and said copper foil were put together and subjected to press under a pressure of 50 kg./cm.$^2$ at 180° C. for 11 minutes, and then heated under a pressure of 70 kg./cm.$^2$ at 270° C. for 30 minutes. Then the pressure and the temperature were lowered to room temperature and atmospheric pressure respectively to obtain a bonded metal plate.

The thus obtained metal plate had a peeling strength of 2.6 kg./cm.² between the aluminium plate and the copper foil, which did not decrease at all even when the metal plate was exposed to hot air at 200° C. for 100 hours.

EXAMPLE 13

The same resin solution as used in Example 2 was coated on a copper foil and dried at 100° C. for 1 hour. The coated copper foil was pressed with a phenol-formaldehyde resin laminate having a thickness of 1 cm. at 160° C. under a pressure of 50 kg./cm.². After heating and pressing for about 1 hour, the temperature and the pressure were gradually lowered to room temperature and atmospheric pressure to obtain a phenol-formaldehyde resin laminate with copper foil, which had an excellent peeling strength of 2.0 kg./cm.² between the copper foil and the phenol-formaldehyde resin laminate.

EXAMPLE 14

An N,N'-dimethylformamide solution containing 15% of the resin obtained in Example 5 was spread on a Teflon plate, heated at 100° C. for 1 hour to obtain a transparent film having a thickness of 30µ.

The thus obtained film was interposed between the surfaces (100 cm.²) of two aluminium plates to be bonded, which had been previously treated with alkali. The assembly was heated at 160° C. for 1 hour under a pressure of 200 kg./cm.².

Then the temperature was lowered gradually to room temperature, after which the pressure was lowered to atmospheric pressure to obtain a laminate of the aluminium plates. The bonded portion of the aluminium laminate had a shearing strength of 132 kg./cm.².

After another aluminium laminate produced in the same process was left to stand for one month in air at 150° C., the shearing strength at the bonded portion was 131 kg./cm.², so that the shearing strength did not substantially decrease.

EXAMPLE 15

The powdery copolymeric resin obtained in Example 2 was molded by a heat press at 220° C. under 70 kg./cm.² into a sheet having a thickness of 3 mm. The resulting sheet was heated in an autoclave under 100 kg./cm.² at a temperature of 320° C. for 30 minutes and then the temperature was decreased to 260° C., thereafter the pressure was decreased to atmospheric pressure and the temperature was gradually cooled to 30° C. in about 1 hour to obtain a foamed sheet expanded 10 times the original volume.

The thus obtained sheet of the resin was insoluble in organic solvents, and even when it was heated at 250° C. for 100 hours it did not change its shape and weight at all, so that it had an extremely high heat resistance.

EXAMPLE 16

On an aluminium plate having a thickness of 1.0 mm. was coated 15% solution of the copolymeric resin obtained in Example 2 in N,N'-dimethylformamide so as to form a resin layer having a thickness of 50µ. Then the resin layers of said two aluminium plates were put together. The assembly was heated and pressed by a hot press at 230° C. under a pressure of 70 kg./cm.² to form an aluminium laminate. The resulting aluminium laminate was heated in a furnace at 350° C. for 20 seconds under atmosphere, whereby a foamed layer composed of fine cells and expanded 20 times the original volume was formed between the two aluminium plates.

Even though the resulting foamed layer of resin was heated at 200° C. for 100 hours, it was neither deformed nor deteriorated.

EXAMPLE 17

15% solution of the resin obtained in Example 7 in a mixed solvent of N,N'-dimethylacetamide/N-methylpyrrolidone at a mixture ratio of 1/1 was extruded into hot air at 160° C. through a nozzle having 15 small holes, the diameter of each hole being 75µ, and the resulting filamentary resin was dried at 210° C. while drawing 1.5 times its original length.

The thus obtained filament had a tenacity of 4.2 g./d. and an elongation of 28%. The filament had no change in the tenacity, even when heated at 180° C. for 48 hours in air.

EXAMPLE 18

A glass cloth was impregnated with 15% solution of the resin obtained in Example 10 in cresol, and the impregnated glass cloth was heated at 210° C. for 1 hour.

The resulting impregnated glass cloth containing 35.2% of the resin had electric properties, such as surface resistance of $10^{15}\Omega$, dielectric constant of 4.8, arc-proof property of 162 seconds and dielectric strength of 44 kv.

What is claimed is:

1. A method of producing oxadiazole-N-methylhydrazide copolymeric resin consisting of repeating N-methylhydrazide structural units having the general formula

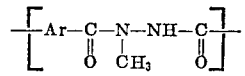

and oxadiazole structural units having the general formula

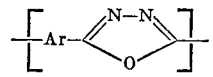

wherein Ar is a bivalent aromatic carbocyclic radical, which comprises reacting polyoxadiazole consisting of the repeating unit

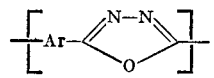

wherein Ar has the same meaning as described above and $n$ a positive integer and represents a polymerization degree corresponding to an intrinsic viscosity of more than 0.3 in 0.5% resin solution in concentrated 98% by weight sulfuric acid at 30° C., with mono- or dimethyl sulfate in concentrated or fuming sulfuric acid, the methyl group in the methyl sulfates being 0.4 to 1.4 mole per 1 mole of the aromatic residue Ar.

2. The method as claimed in claim 1, wherein said concentrated sulfuric acid had a concentration of 80 to 110% by equivalent.

3. The method as claimed in claim 1, wherein the methyl group in the said methyl sulfates is 0.6 to 1.2 mole against 1 mole of said aromatic residue in polyoxadiazole.

4. The method as claimed in claim 1, wherein the reaction is carried out at a temperature of 60 to 160° C.

5. The method as claimed in claim 1, wherein said mono- or dimethyl sulfate itself is added directly to the reaction system.

6. A method of producing polyoxadiazole having the repeating unit

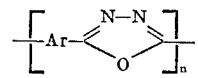

wherein Ar is a bivalent aromatic carbocyclic radical and $n$ is a positive integer and represents a polymerization degree corresponding to an inherent viscosity of more than 0.3 in 0.5% resin solution in concentrated sulfuric acid at 30° C. which comprises heating at a temperature of 220 to 600° C. oxadiazole-N-methylhydrazide copolymeric resin composed of 30 to 70 mol percent of N-methylhydrazide structural unit having the general formula

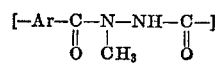

and 70 to 30 mol percent of oxadiazole structural unit having the general formula

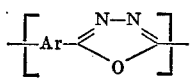

7. The method as claimed in claim 1, wherein said mono- or dimethyl sulfate is prepared by adding a compound which can react with the concentrated sulfuric acid to form said methyl sulfates to the concentrated sulfuric acid or fuming sulfuric acid.

8. The method as claimed in claim 6, wherein said compound which can react with the concentrated sulfuric acid to form said methyl sulfates is methanol, methyl ether or methyl benzoate.

9. Oxadiazole - N-methylhydrazide copolymeric resin having an inherent viscosity of more than 0.3 in 0.5% resin solution in N,N-dimethylacetamide, N,N-dimethylformamide, N-methylpyrrolidone, or cresol, wherein the N-methylhydrazide structural unit having the general formula

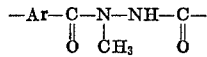

constitutes 30 to 70 mol percent of said resin and the oxadiazole structural unit having the general formula

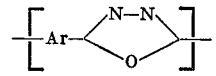

constitutes 70 to 30 mol percent of said resin, wherein Ar represents a bivalent aromatic carbocyclic radical.

10. The resin as claimed in claim 9, wherein said N-methylhydrazide structural unit is 45 to 55 mol percent and said oxadiazole structural unit is 55 to 45 mol percent.

11. A film of the resin defined in claim 9.

12. A filament of the resin defined in claim 9.

References Cited

UNITED STATES PATENTS

| | | | |
|---|---|---|---|
| 3,130,182 | 4/1964 | Frazer | 260—78 |
| 3,238,183 | 3/1966 | Frazer | 260—78.4 |
| 3,275,608 | 9/1966 | Montgomery et al. | 260—78.4 |

HAROLD D. ANDERSON, Primary Examiner

U.S. Cl. X.R.

117—161 P; 161—182, 227; 260—2.5 N, 2.5 R, 30.2, 30.8 R, 32.6 N, 33.4 R, 47 CZ, 78 TF, 78.4 R